UNITED STATES PATENT OFFICE.

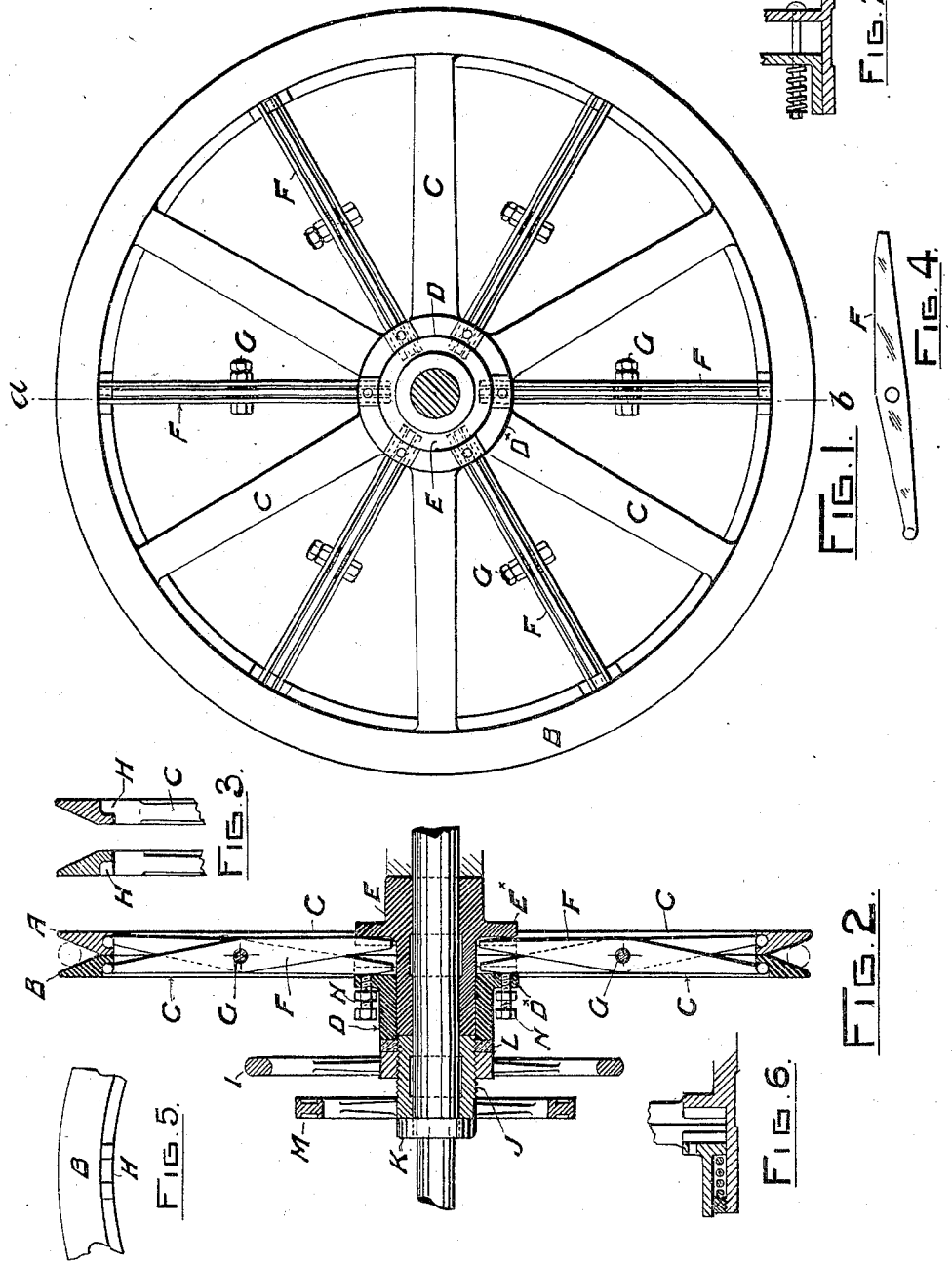

DAVID NOBLE BERTRAM AND SAMUEL MILNE, OF EDINBURGH, SCOTLAND.

EXPANDING ROPE-PULLEY.

SPECIFICATION forming part of Letters Patent No. 725,024, dated April 14, 1903.

Application filed March 10, 1902. Serial No. 97,498. (No model.)

*To all whom it may concern:*

Be it known that we, DAVID NOBLE BERTRAM and SAMUEL MILNE, subjects of the King of Great Britain and Ireland, and residents of Edinburgh, Scotland, have invented a new or Improved Construction of Expanding Rope-Pulley, of which the following is a specification.

This invention relates to and consists of a new or improved construction of rope-pulley capable of having its size increased or reduced while in motion or otherwise.

On the accompanying drawings, Figure 1 represents a side view of such pulley, and Fig. 2 a vertical section on line $a\,b$ of such pulley and certain regulating devices used therewith. Fig. 3 represents vertical sections of the pulley-rim, and Figs. 4, 5, and 6 represent details.

The pulley shown is such as is loose upon its shaft and imparting action to the object to be driven by a friction clutch or sleeve. (Not shown.)

According to the invention the pulley is made in two halves—*i. e.*, divided in the plane of its groove with one face or side of the groove on one half, A, and the other face or side of the groove on the other half, B. Each half has its own spokes C. The half A has a boss or hub D, and the half B has a boss or hub E, which is elongated and carries the boss D, as shown. Between the rim and the said bosses of the pulley is a series of levers F, (see Fig. 4,) and such levers are arranged in sets of three at suitable distances apart, as shown in Fig. 1. Each set is pivoted centrally and "scissor" fashion upon a pin or stud G, and at one extremity each set takes into recesses or cavities formed by flanges $D^\times E^\times$ of the bosses D E and at the other extremity take alternately into grooves or cavities H in the half-portions of the rim, (see Fig. 2,) the extremities of the levers engaging the boss D taking into a recess in the half-rim A and the extremities of the lever engaging the boss E taking into a recess in the half-rim B. The half-pulley A and its boss D are loose on the shaft, but incapable of endwise movement, while the half-pulley B and its boss E are mounted on a sliding key, and therefore movable with the boss E and capable of approaching and receding from the half-portion A. With the half-portions in, say, the position shown in Fig. 2 the full diametrical value of the pulley is obtained; but upon allowing the half-portion B to separate from the half-portion A the diametrical value of the pulley is reduced. To facilitate the adjustment of the half-portion B, we provide any suitable means, but preferably a hand-wheel I, mounted upon a screw-threaded boss J, lying between the end of the boss E and a fixed flange K. We also provide an antifriction-ring L between the wheel I and boss D capable of lateral movement only along the boss J. With the pulley not in motion and the boss T held stationary the rotation of the hand-wheel I causes the half-pulley B to move to or fro along the boss E. To permit of the adjustment taking place while the pulley is in motion, we provide the boss J with a brake-wheel M, so that by applying a brake-strap to such wheel the motion of the boss T, due to the thrust of the boss D, is retarded, and the hand-wheel can then be rotated in either direction without fear of receiving motion from the pulley. To regulate the contact of the levers F with the boss-flange D, we may provide set-screws and lock-nuts N, and to reduce friction ball or like bearings may be applied between the boss J and the flange or thrust-collar K. A spring may also be applied to resist the outward pressure of the boss D, introduced, say, between the hub D and boss E, as shown in Fig. 6, or otherwise. The scissor-levers being centrally pivoted, the motion of the boss D to close or open the pulley is identical with that of the rim.

In lieu of three levers to each set there may be two levers only.

As a modification both halves of the pulley may fit the shaft and be keyed thereon, with the half-portion B capable of lateral movement under the pressure of the rope and the adjustment of a hand-wheel; but we prefer the arrangement as shown.

What we claim is—

1. An expanding rope-pulley comprising two half-parts each composed of one-half of the pulley-rim and each having its own spokes and boss; a series of levers between the rim and bosses; studs on which said levers are axially mounted "scissor" fashion; and means for moving one half of the pulley to and from the other half, substantially as set forth.

2. An expanding rope-pulley comprising two half-parts, each having one-half of the rim, a series of spokes, and a boss; sets of levers between the rim and bosses; and studs on which such levers are axially mounted, substantially as set forth.

In witness whereof we have hereunto set our hands in the presence of two witnesses.

DAVID NOBLE BERTRAM.
SAMUEL MILNE.

Witnesses:
WILLIAM HENRY MOFFATT,
JOHN INNES MELVIN.